UNITED STATES PATENT OFFICE.

JOSEPH P. CARD, OF CHICAGO, ILLINOIS.

SOLUTION FOR PRESERVING WOOD.

SPECIFICATION forming part of Letters Patent No. 419,582, dated January 14, 1890.

Application filed July 22, 1889. Serial No. 318,306. (No specimens.)

*To all whom it may concern:*

Be it known that I, JOSEPH P. CARD, of Chicago, Illinois, have made a new and useful Improvement in Wood-Preserving or Kyanizing Solutions, of which the following is a full, clear, and exact description.

The improvement relates more especially to a novel preservative compound.

To obtain the best results in wood-preserving, the preservative should be introduced thoroughly into the wood. To thus introduce the preservative, at least within a resonable time, pressure must be employed. On account of the injury it occasions to metal, corrosive sublimate cannot be used in the closed metallic cylinders which are necessary when pressure is employed, in sufficient quantity to of itself insure the preservation of the wood, the common practice being to steep the wood in open wooden vats containing the corrosive sublimate and to take one day for each inch in thickness of the wood, not counting the day the wood is placed in or the day it is taken out of the vat; or, say, for a six-inch by six-inch stick of timber, taking eight days in a solution consisting, by weight, of one part of corrosive sublimate to ninety-nine parts of water. By reason of this and other objections, corrosive sublimate, although a valuable wood-preservative, is not used as frequently as is desirable. To avoid the difficulty referred to as much as possible, to provide for handling corrosive sublimate to better advantage, and to obtain the benefits to be derived from the joint and simultaneous use of both salts, is the object of this improvement, which consists in employing corrosive sublimate and chloride of zinc in conjunction, whereby a solution is obtained which, and with the usual means employed in injecting wood-preservative solutions under pressure, can be introduced thoroughly into all parts of the wood, so that the wood throughout shall be impregnated with corrosive sublimate as well as with chloride of zinc, and at the same time without materially injuring the containing-cylinder or other metallic appliances involved in the operation— that is, by conjoining the chloride-of-zinc portion with the other portion of the solution, the proportion of corrosive sublimate is reduced sufficiently to admit of its being used in iron cylinders for wood-preservation in the usual way, and the chloride-of-zinc portion, on the other hand, is of assistance, both as a vehicle in conveying the corrosive sublimate throughout the wood and as an efficient preservative in itself.

As the most desirable formula in carrying out the improvement, I take, by weight, of corrosive sublimate, one part; of chloride of zinc, twenty parts; of water, nine hundred and seventy-nine parts.

With this solution and with the customary apparatus for introducing under pressure such a preservative as chloride of zinc into wood, I proceed to treat the wood to be preserved substantially in the same manner as when an ordinary chloride-of-zinc solution is being introduced.

I desire not to be limited to the above-named proportions, for in working the process commercially I may have to reduce the strength of the corrosive sublimate on account of its corrosive properties. The per cent. of chloride of zinc depends upon the per cent. of corrosive sublimate used and the kind of wood to be treated and its condition as to dryness. Water alone would answer to thin the corrosive sublimate to the described safety-point, but water would not do for a wood-preservative. A mineral-salt solution such as named serves both as a thinner and as a preservative. The method of preserving wood hereinbefore described is, in fact, an improved method of kyanizing, in which less of the corrosive sublimate is used and chloride of zinc is added to aid in obtaining the result.

I am aware that alkaline chlorides have been used to render the mercuric chloride more soluble, and also that in an embalming fluid the zinc chloride and chloride of mercury have been used together with other agents which would prove detrimental in preserving timber; therefore,

What I claim as my invention is—

The herein-described wood-preserving or kyanizing solution, consisting of nine hundred and seventy-nine parts of water, twenty parts of chloride of zinc, and one part of corrosive sublimate, as specified.

Witness my hand this 16th day of July, 1889.

JOSEPH P. CARD.

Witnesses:
J. W. FORSYTH,
J. W. PENNELL.